US010887213B2

(12) United States Patent
Chabbi et al.

(10) Patent No.: US 10,887,213 B2
(45) Date of Patent: Jan. 5, 2021

(54) PATH-SYNCHRONOUS PERFORMANCE MONITORING OF INTERCONNECTION NETWORKS BASED ON SOURCE CODE ATTRIBUTION

(71) Applicant: Hewlett Packard Enterprise Development LP, Houston, TX (US)

(72) Inventors: Milind M Chabbi, Palo Alto, CA (US); Michael Schlansker, Los Altos, CA (US); Adarsh Yoga, Palo Alto, CA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 0 days.

(21) Appl. No.: 15/705,950

(22) Filed: Sep. 15, 2017

(65) Prior Publication Data
US 2019/0089616 A1    Mar. 21, 2019

(51) Int. Cl.
*H04L 12/26*    (2006.01)
*H04L 29/08*    (2006.01)
(Continued)

(52) U.S. Cl.
CPC .......... *H04L 43/12* (2013.01); *G06F 11/3006* (2013.01); *G06F 11/3409* (2013.01); *H04L 43/022* (2013.01); *H04L 67/22* (2013.01)

(58) Field of Classification Search
CPC ...... H04L 43/12; H04L 67/22; G06F 11/3006; G06F 11/3409
See application file for complete search history.

(56) References Cited

U.S. PATENT DOCUMENTS 7,619,990 B2 * 11/2009 Alicherry ................ H04L 45/04
370/254
7,676,560 B2 *  3/2010 McCollum .......... H04L 41/0233
709/223
(Continued)

OTHER PUBLICATIONS

Ammons, G., et al.; "Exploiting hardware performance counters with flow and context sensitive profiling"; 1997; 12 pages.
(Continued)

*Primary Examiner* — Huy D Vu
*Assistant Examiner* — Bailor C. Hsu
(74) *Attorney, Agent, or Firm* — Hewlett Packard Enterprise Patent Department

(57) ABSTRACT

Examples disclosed herein relate to path-synchronous performance monitoring of an interconnection network based on source code attribution. A processing node in the interconnection network has a profiler module to select a network transaction to be monitored, determine a source code attribution associated with the network transaction to be monitored, and issue a network command to execute the network transaction to be monitored. A logger module creates, in a buffer, a node temporal log associated with the network transaction and the network command. A drainer module periodically captures the node temporal log. The processing node has a network interface controller to receive the network command and mark a packet generated for the network command to be temporally tracked and attributed back to the source code attribution at each hop of the interconnection network traversed by the marked packet.

20 Claims, 7 Drawing Sheets

(51) Int. Cl.
 *G06F 11/30* (2006.01)
 *G06F 11/34* (2006.01)

(56) References Cited

U.S. PATENT DOCUMENTS

| | | | |
|---|---|---|---|
| 7,752,324 B2* | 7/2010 | Hamadeh | H04L 63/1408 709/230 |
| 7,953,908 B2* | 5/2011 | Ward | G06F 13/385 709/234 |
| 8,020,149 B2 | 9/2011 | Wolf | |
| 8,244,862 B2 | 8/2012 | Qian et al. | |
| 8,825,820 B2 | 9/2014 | Gerber et al. | |
| 9,378,238 B2* | 6/2016 | Gonsalves | H04M 3/2218 |
| 9,558,465 B1* | 1/2017 | Arguelles | G06Q 10/0639 |
| 9,602,375 B2* | 3/2017 | Tessmer | H04L 43/0811 |
| 9,697,545 B1 | 7/2017 | Hermany et al. | |
| 9,722,900 B2 | 8/2017 | Reynolds et al. | |
| 9,781,118 B2* | 10/2017 | Li | H04L 63/101 |
| 9,838,292 B2* | 12/2017 | Polychronis | H04L 43/08 |
| 10,127,284 B2* | 11/2018 | Allen | G06F 17/3053 |
| 10,200,279 B1* | 2/2019 | Aljaedi | H04L 43/50 |
| 2002/0038313 A1* | 3/2002 | Klein | G06F 17/30492 |
| 2006/0085861 A1* | 4/2006 | Belenky | H04L 63/1425 726/26 |
| 2007/0061451 A1* | 3/2007 | Villado | G06F 9/54 709/224 |
| 2012/0331551 A1* | 12/2012 | van Steenbergen | H04L 45/02 726/22 |
| 2017/0187587 A1* | 6/2017 | Keppel | H04L 43/062 |
| 2018/0241648 A1* | 8/2018 | Jenkins | H04L 43/08 |

OTHER PUBLICATIONS

White Paper; "The Convergence of Network Performance Monitoring and Application Performance Management"; 2012; 5 pages.

Yu, M, et al.; "Profiling Network Performance for Multi-tier Data Center Applications"; May 30, 2011; 14 pages.

Zhu, Y. et al., "Packet-level Telemetry in Large Datacenter Networks"; Aug. 17-21, 2015; 13 pages.

Chakchai So-In, "A Survey of Network Traffic Monitoring and Analysis Tools", availble online at <https://web.archive.org/web/20170528123955/https://www.cse.wustl.edu/~jain/cse567-06/ftp/net_traffic_monitors3/index.html>, May 28, 2017, 29 pages.

* cited by examiner

100
PATH-SYNCHRONOUS PERFORMANCE MONITORING OF INTERCONNECTION NETWORKS BASED ON SOURCE CODE ATTRIBUTION

STATEMENT OF GOVERNMENT RIGHTS

This invention was made with Government support under Award No. DE-SC0012199 and Prime Contract No. DE-AC52-07NA27344 awarded by the Department of Energy. The Government has certain rights in this invention.

BACKGROUND

Interconnection networks are networks composed of source and destination processing nodes interconnected by switching and/or routing components. Data moves from source to destination by passing through numerous switching and/or routing components that may be independent from each other and form a complex network topology. Examples of interconnection networks may include High Performance Computing ("HPC") networks, Ethernet LANs, and the World Wide Web. Understanding data movement in these networks is critical to understanding how to achieve good application performance.

Performance bottlenecks in interconnection networks may arise out of any of the possibly shared, independently executing network components and the effects of each network component on another. Bottlenecks may occur in Network Interface Controllers ("NICs") at processing nodes, switch hops, forward/return paths and algorithms used for routing, topology configuration, and hardware provisioning, among others.

Traditional performance monitoring tools for analyzing interconnection networks are able to capture source and destination information of data flowing through a network component, but lack the full path information traveled by the data. Synchronized data collection in all the components of an interconnection network is also infeasible due to very high operating rates and excessive overheads of synchronization.

BRIEF DESCRIPTION OF THE DRAWINGS

The present application may be more fully appreciated in connection with the following detailed description taken in conjunction with the accompanying drawings, in which like reference characters refer to like parts throughout, and in which.

DETAILED DESCRIPTION

Figure 1:
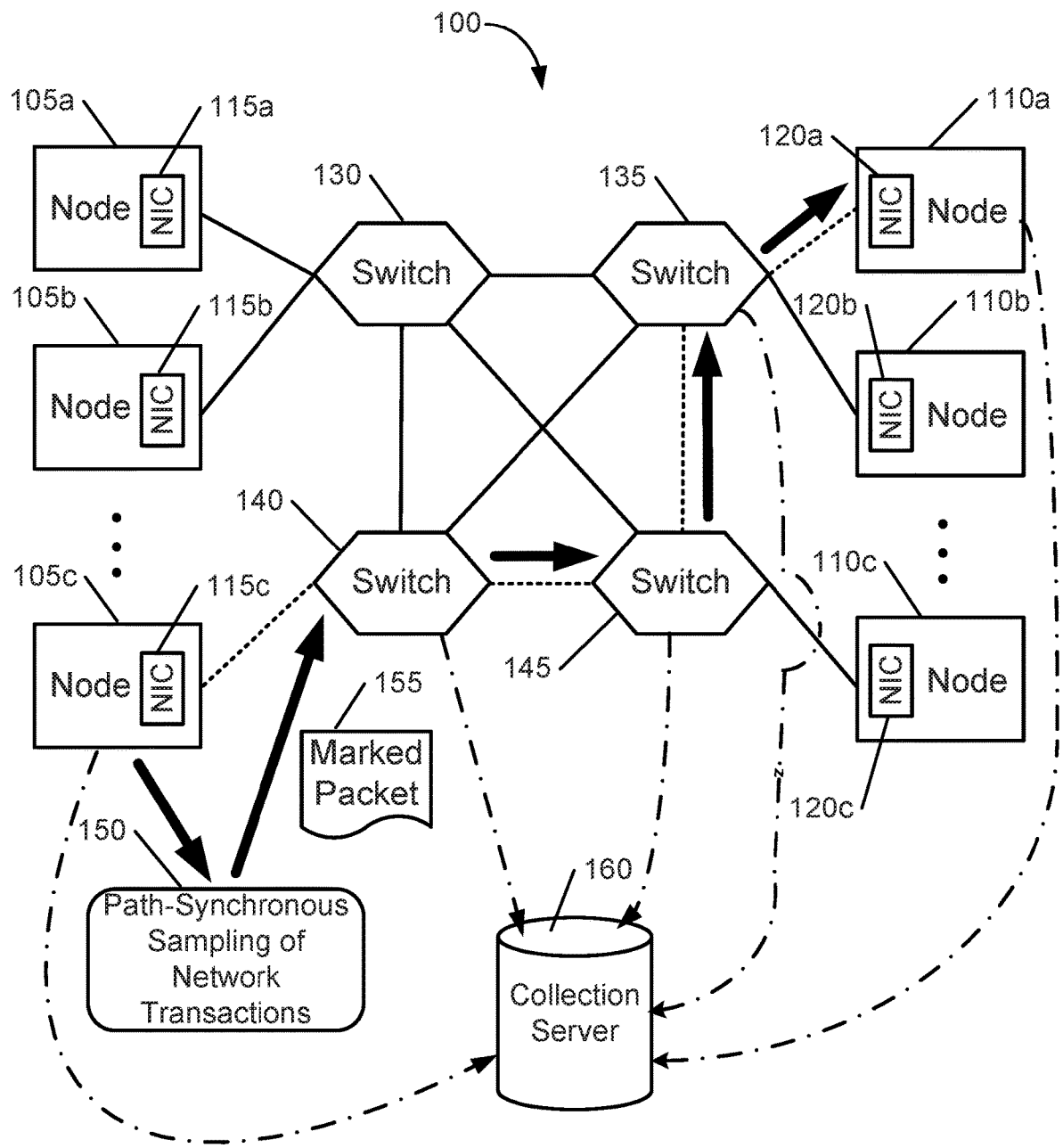
FIG. 1 illustrates a schematic diagram of an interconnection network in accordance with various examples.

A path-synchronous performance monitoring system for interconnection networks based on source code attribution is disclosed. The performance monitoring system enables path-synchronous sampling of network transactions, which as described herein below, refers to periodically monitoring a network transaction or a network-related event originating at a source processing node (e.g., a processing node such as a CPU issuing a network data send command), following its propagation through every component in an interconnection network (e.g., a switch, a router, etc.), and collecting performance metrics in temporal logs in each network component. Such detailed tracking retains temporal correlation among performance metrics and enables a sampled network transaction to be attributed back to its application source code, thereby allowing application developers to understand, isolate and correct performance bottlenecks, including the ability to distinguish between systematic structural issues and transient network behaviors.

An interconnection network, as generally described herein, is a network composed of source and destination processing nodes interconnected by switching and/or routing components. The source and destination processing nodes typically include Network Interface Controllers ("NICs") for connecting the processing nodes to the network. The switching and/or routing components may include network switches, routers or any other network component capable of receiving, processing and forwarding data to another network component. Data may travel in the network in the form of packets, with each packet including a packet header and a data payload. Examples of packet-based interconnection networks may include High Performance Computing ("HPC") networks, Ethernet Local Area Networks ("LANs"), Ethernet Wide Area Networks ("WANs"), and the World Wide Web, among others. The term "network" should not be confused herein with intra-node networks between CPUs and memory; however, all inter-node transactions messaging, Remote Direct Memory Access ("RDMA"), or load/store semantics, shared-memory or distributed memory, cache coherent or otherwise, are within the scope of this disclosure.

Source code attribution is achieved by identifying what happens to a network transaction, or a sequence of packets, initiated by a line of source code throughout its journey through the network. A network transaction is selected to be monitored at a source processing node on a sampling basis, as observing every network transaction in the network is infeasible both from a space and a time perspective. One in N network transactions are chosen to be tracked throughout its journey, where N can be selected arbitrarily or based on pre-determined criteria. The sampling ensures that any network transaction or event that is statistically significant may be observed with the frequency proportional to its occurrence.

It is appreciated that, in the following description, numerous specific details are set forth to provide a thorough understanding of the examples. However, it is appreciated that the examples may be practiced without limitation to these specific details. In other instances, well-known methods and structures may not be described in detail to avoid unnecessarily obscuring the description of the examples. Also, the examples may be used in combination with each other.

Referring now to FIG. 1, a schematic diagram of an interconnection network in accordance with various examples is described. Interconnection network 100 is shown with a plurality of processing nodes and switching components. Processing nodes 105a-c are shown on the left of the interconnection network 100 to represent source processing nodes, i.e., processing nodes from where network transactions originate. Processing nodes 120a-c are shown on the right of the interconnection network 100 to represent destination processing nodes, i.e., processing nodes that serve as the final destination for packets traveling through the interconnection network 100. Source processing nodes 105a-c include NICs 115a-c, while destination processing nodes 110a-c include NICs 120a-c. NICs 115a-c receive network commands from source processing nodes 105a-c. The network commands may include, for example, a command to send a series of packets through the interconnection network 100 to one of the destination processing nodes 110a-c. It is appreciated that instead of NICs, network components in interconnection network 100 may include a bridge or any other hardware component that handles inter-node data transfer in an interconnection network.

Packets travel through the interconnection network 100 through a series of network components, such as, for example, a series of switches 130-145. It is appreciated that the specific path that a packet may follow from any source processing node to any destination processing node may be determined by a routing algorithm based on a number of factors, such as, for example, the topology of the network, traffic patterns in the network, temporal factors, and so on.

In various examples, packets may travel from source processing node 105c to destination processing node 110a through switch 140, switch 145 and switch 135, as illustrated by the bolded arrows in FIG. 1. A network transaction generating packets to be forwarded from source processing node 105c to destination processing node 110c is selected for monitoring at the source processing node 105c on a path-synchronous sampling basis (150), either arbitrarily or based on pre-determined criteria. As generally described herein, a system for path-synchronous sampling of network transactions (150) enables the periodic monitoring of network transactions or network-related events originating at a source processing node (e.g., source processing node 105c), following the propagation of a monitored transaction through every component in the interconnection network 100, and collecting performance metrics in temporal logs in each network component. The performance metrics may include, for example, information such as network queue length, a flag to indicate that packet transmission stalled due to a lack of down-level link credits, time spent in various phases of store-and-forward process, including details of arbitration, as well as various identification, timing, and source and destination information.

The source processing node 105c captures a source code attribution corresponding to the network transaction to be monitored and creates a unique identifier ("CID") for a network command to execute the transaction. It is appreciated that a single network transaction may potentially require multiple network commands to execute it, in which case a unique identifier is assigned to each command. As generally described herein, a source code attribution may be, for example, a CPU calling context ("CTXT") indicating a source code location of an instruction initiating a network transaction, a source code location associated with a network event related to the network transaction (e.g., a network wait event), or any other source code identification that ties a source code location to the network transaction to be monitored.

When monitoring a network transaction, the source processing node 105c issues a network command to its NIC 115c that is represented by a Transaction Monitoring ("TM") tag and the unique identifier CID. The TM tag is a bit that is enabled anytime a network command is issued to a NIC for a network transaction that is to be monitored throughout the interconnection network 100. Both the TM tag and the unique CID are passed to the NIC 115c when the network command is issued. Doing so requires enabling a network protocol implemented in network 100 to include a field for the TM tag and a field for the CID in its network commands.

As described in more detail herein below, the source processing node 105c and the NIC 115c collect performance metrics in temporal logs. The temporal log created by the source processing node 105c, for example, records in a data tuple the source code attribution CTXT, the unique identifier for the network command CID, a time of issuance of the network command, an indication of the source processing node 105c, and an indication of the destination processing node 110a.

Upon receiving the network command with the TM tag enabled, the NIC 115c, obeying underlying transport layer protocols, generates packets for the command corresponding to the network transaction to be monitored. It is appreciated that receiving a network command with the TM tag enabled indicates to the NIC 115c that one or more packets to be generated for the network command should be tracked throughout their journey in interconnection network 100. The NIC 115c selects the one or more of the packets to be tracked on sampling basis.

Tracking packets in interconnection network 100 is accomplished by enabling the network protocol implemented in network 100 to include a single bit in each packet's header to be designated as a Performance Monitoring ("PM") tag. In various examples, the PM tag may be included in a designated offset in the packet header to make it quick to inspect. The PM tag can be enabled or disabled as desired. Enabling a PM tag in a packet signifies to components in the network 100 that the packet is to be tracked throughout the network. Packets having the PM tag enabled are referred to herein as "marked" packets, for they are marked as the packets to be tracked throughout the network 100.

Before forwarding marked packets to their next hop in the network 100 (e.g., switch 140 in the case of marked packet 155), NIC 115c, similar to source processing node 105c, also collects performance metrics for the marked packets in a temporal log. The marked packets are identified by a Packet ID ("PKID") that is recorded at data tuples in the NIC 115c's temporal log together with timing information, e.g., a time that the NIC 115c received the network command, a time that the NIC 115c marked the packets, and a time that the NIC 115c forwards the marked packets to their next hop. The temporal logs generated by the NIC 115c, together with the temporal logs generated by the source processing node 105c, are recorded in a local buffer in the source processing node 105c. It is appreciated that the temporal logs generated by the NIC 115c and the temporal logs generated by the source processing node 105c are separate logs but may be stored in the same local buffer (or also in separate local buffers) in the source processing node 105c.

Every network component in network 100, including, for example, switches 140, 145 and 135 in the path illustrated in FIG. 1 with the bolded arrows, continuously monitors the PM tag of each packet it routes. If a PM tag is enabled in an incoming packet, that is, if a packet is a marked packet such as marked packet 155, the network component collects performance metrics in a temporal log that is stored in a local buffer of the network component (i.e., local buffers in switches 140, 145 and 135). The network component also propagates the PM tag from incoming packets to the corresponding outgoing packets.

All the temporal logs recorded throughout the interconnection network 100 are drained to collection server 160. The collection server 160, as described in more detail below, may be a central, distributed server that analyzes the temporal logs collected from all network components through which every marked packet traverses, e.g., temporal logs from source processing node 105c, NIC 115c, switches 140, 145 and 135, NIC 120a, and destination processing node 110a, for marked packet 155. The collection server 160 then reconstructs the paths traversed by the marked packets to identify any potential issues and/or bottlenecks experienced by the marked packets when traversing the network 100. The collection server 160 may, for example, identify the marked packets that took the most time to traverse the network 100, identify whether marked packets were slowed down during a given time window, identify whether marked packets were slowed when passing through a given network component, and so on.

Figure 2:
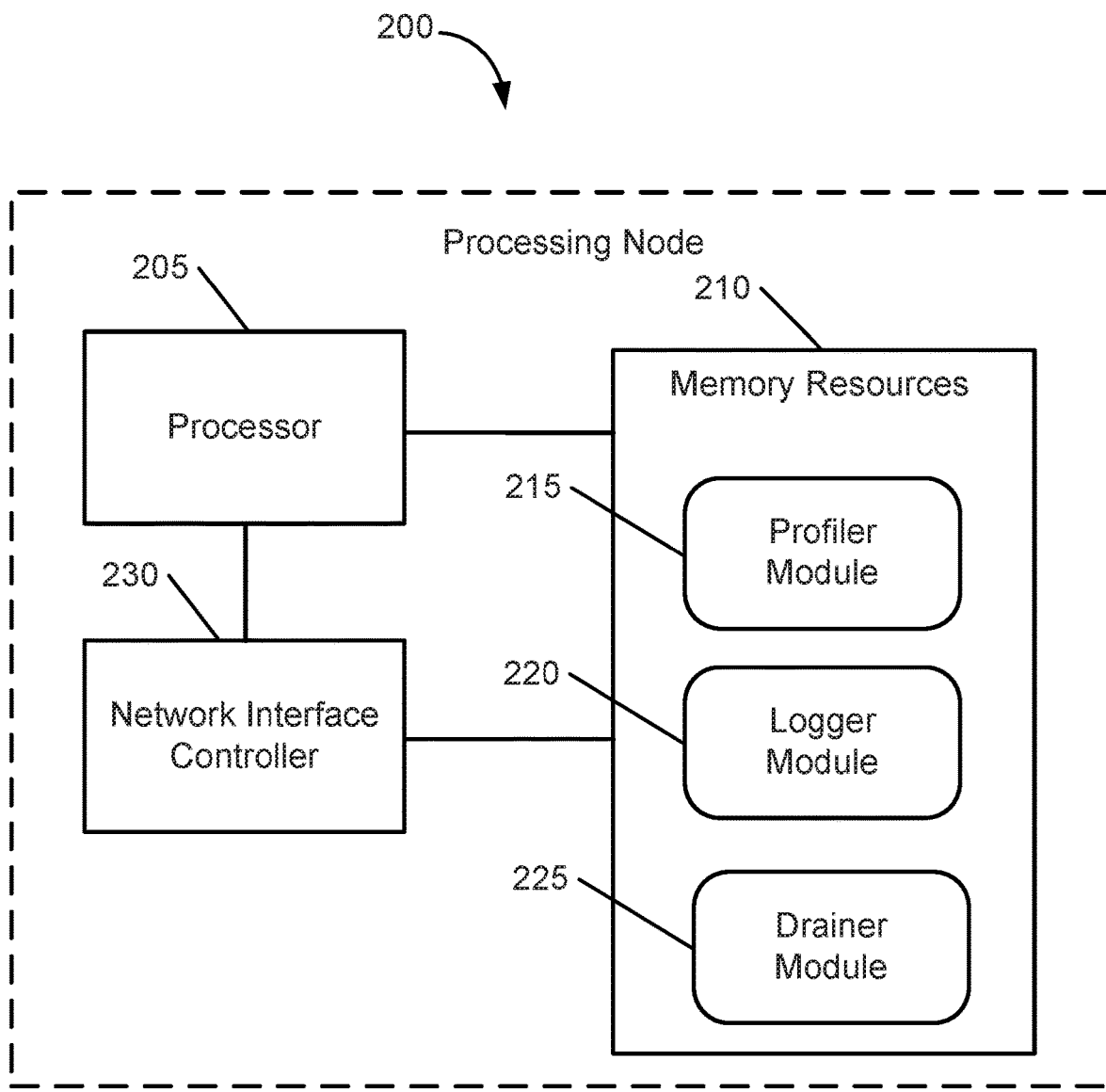
FIG. 2 is a block diagram of an example processing node which may be incorporated into the interconnection network of FIG. 1.

Attention is now directed at FIG. 2, which shows a block diagram of an example processing node which may be incorporated into the interconnection network of FIG. 1. Processing node 200 may be, for example, a source processing node in interconnection network 100, such as source processing nodes 105a-c. Processing node 200 has a processor 205 and a set of memory resources 210. A memory resource, as generally described herein, can include any number of volatile or non-volatile memory components capable of storing instructions that can be executed by a processor. It is appreciated that memory resources 210 may be integrated in a single device or distributed across multiple devices. Further, memory resources 210 may be fully or partially integrated in the same device (e.g., a server) as their corresponding processor 205 or they may be separate from but accessible to their corresponding processor 205.

Memory resources 210 store a Profiler Module 215, a Logger Module 220 and a Drainer Module 225 for processing node 200. It is appreciated that other modules can be added to memory resources 210 for additional or alternative functionality. Each of modules 215-225, and any other modules added to memory resources 210, may be any combination of hardware (e.g., a processor or other circuitry) and software (e.g., machine or processor-executable instructions, commands, or code such as firmware, programming or object code) to implement the functionalities of the respective module. Such combinations of hardware and software may be implemented in a number of different ways.

Profiler Module 215 has instructions to select a network transaction to be monitored, determine a source code attribution associated with the network transaction and issue a network command represented by a unique identifier. The network command also has a TM tag enabled to indicate to NIC 230 that the network transaction is to be monitored. The network transaction to be monitored is selected by the processing node 200 on a sampling basis, performed in bursts or in a sparse manner, either arbitrarily or based on pre-determined criteria. The Profiler Module 215 captures the source code attribution, e.g., a CPU calling context CTXT or a source code location, corresponding to the network transaction to be monitored and creates a unique identifier CID to represent a network command for executing the transaction. Profiler Module 215 instructs a CPU in processing node 200 to issue the network command to Network Interface Controller ("NIC") 230 in processing node 200, passing the CID and the enabled TM tag to NIC 230. The network command may include, for example, a command to send packets to a destination processing node in interconnection network 100 of FIG. 1. It is appreciated that TM tag may be enabled for multiple network transactions, or carried over from a command to another to capture a higher-level messaging protocol that may involve multiple commands.

The NIC 230, upon receiving the network command with an enabled TM tag, generates a plurality of packets for the network command and marks one or more of the plurality of packets to be injected into the network on behalf of the command. The marked packets are temporally tracked at each hop of the interconnection network that they traverse. The NIC 230, when issued an enabled TM tag from the network command, selects one or more packets to be marked that it injects into the network on behalf of the command. The selection of the one or more marked packets can also be made on a sampling basis, either arbitrarily or based on pre-determined criteria.

Marked packets are tagged to be tracked by enabling the PM tag in their headers. When the marked packets are forwarded to a destination processing node in the interconnection network, e.g., interconnection network 100 of FIG. 1, each network component in the path traversed by the marked packets inspects incoming packets to determine whether they are marked packets. As described in more detail herein below, marked packets arriving at network components are temporally tracked by recording performance metrics associated with the marked packets in hop temporal logs.

Processing node 200 also records performance metrics associated with the monitored network transaction. Logger Module 215 in processing node 200 creates, in a buffer, a node temporal log associated with the network transaction to be monitored and the network command issued to the NIC 230. The node temporal log has a number of data fields stored in data tuples, such as, for example, a field for the source code attribution (e.g., CTXT), a field for the unique identifier CID representing the network command, a temporal field for a time of issuance of the network command, a field to indicate the processing node 200 as a source processing node, and a field to indicate a destination processing node for the marked packets. The source processing node and the destination processing node may be, in various examples, identified by their network identities. The NIC 230 records performance metrics associated to the marked packets in a NIC temporal log stored in the local buffer in processing node 200.

The node temporal logs created by Logger Module 215 in processing node 200 are periodically captured by Drainer Module 220, which then sends the captured node temporal logs to a collection server coupled to the interconnection network. The collection server, as described in more detail herein below, also stores a plurality of hop temporal logs that are drained from the network components traversed by the marked packets on their way to their destination processing node. The collection sever may implement a Network Performance Analysis Module (shown in FIG. 6) to reconstruct and analyze the path traversed by the marked packets based on the node temporal logs, the NIC temporal log and the hop temporal logs. Doing so enables a sampled network transaction to be attributed back to its application source code, thereby allowing application developers to understand, isolate and correct performance bottlenecks in the interconnection network, including the ability to distinguish between systematic structural issues and transient network behaviors.

Figure 3:
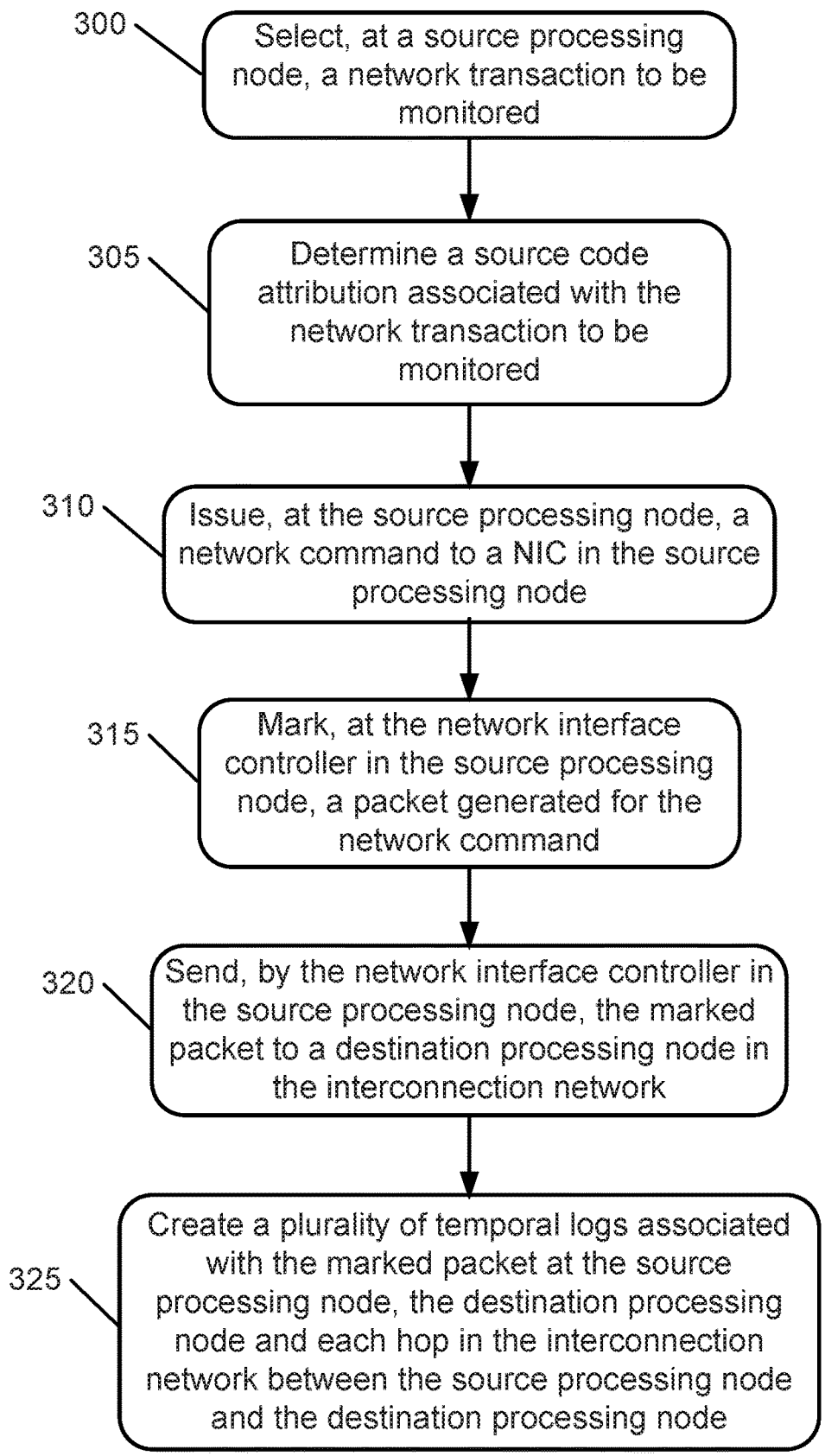
FIG. 3 is a flowchart for monitoring performance of an interconnection network based on source code attribution in accordance with various examples.

Referring now to FIG. 3, a flowchart for monitoring performance of an interconnection network based on source code attribution in accordance with various examples is described. First, a network transaction is selected to be monitored at a source processing node (300). The network transaction is selected by a Profiler Module residing at the source processing node, e.g., Profiler Module 215 of FIG. 2, on a sampling basis. That is, one in N network transactions are chosen to be monitored throughout its journey in the interconnection network, where N can be selected arbitrarily or based on pre-determined criteria.

Next, the source processing node determines a source code attribution associated with the network transaction to be monitored (305). The source code attribution may include a CPU calling context ("CTXT") indicating a source code location of an instruction initiating the network transaction to be monitored, a source code location associated with a network event related to the network transaction (e.g., a network wait event), or any other source code identification that ties a source code location to the network transaction to be monitored. The source processing node then issues a network command to a network interface controller in the source processing node. The network command is represented by a unique identifier and is issued to execute the network transaction to be monitored (310). The source processing node passes the unique identifier CID and an enabled TM tag to the network interface controller ("NIC") when issuing the network command to the NIC.

The NIC at the source processing node then marks a packet generated for the network command (315). The packet is also marked on a sampling basis, i.e., one in N packets, where N is selected in random or based on pre-determined criteria, is marked by enabling the PM tag in the packet's header. The marked packets are then sent from the network interface controller in the source processing node to a destination processing node in the interconnection network (320).

A plurality of temporal logs associated with the marked packets are created at the source processing node, the NIC at the source processing node, the destination processing node and at each hop in the interconnection network between the source processing node and the destination processing node (325). The temporal logs are stored in local buffers in their respective network components (e.g., source and destination processing nodes, and switches between the source and destination processing nodes). A temporal log created at a source processing node, for example, is referred to herein as a node temporal log and stores a number of fields in data tuples, such as a field for the source code attribution value, a field for the unique identifier CID representing the network command, a temporal field for a time of issuance of the network command, a field to indicate the source processing node, and a field to indicate the destination processing node.

A temporal log created at the NIC within the source processing node, referred to herein as a NIC temporal log, has a field for the unique identifier CID representing the network command, a field for a packet identifier "PKID" created by the NIC to identify a marked packet (e.g., marked packet 455), a temporal field to indicate a time value (e.g., T2) corresponding to a time when the NIC receives the network command, a temporal field to indicate a time value (e.g., T3) corresponding to a time when the first packet for the network command is sent to its next hop (e.g., switch 445 for marked packet 455 of FIG. 4), a temporal field to indicate a time value (e.g., T4) corresponding to a time when the first marked packet for the network command is sent to its next hop, a temporal field to indicate a time value (e.g., T5) corresponding to a time when the last packet for the network command is sent to its next hop, a field to identify the source processing node (e.g., A), a field to identify the network component in the next hop (e.g., switch 445), and a field to identify the destination processing node (e.g., B).

Similarly, a temporal log created for each hop in the interconnection network traversed by the marked packets between the source and destination processing nodes stores a number of fields in data tuples, such as a field to record the packet identifier, a field to identify the network component in the next hop (e.g., switches 145 or 135 as shown in FIG. 1), a temporal field to indicate a time of arrival of the marked packet in the network component, a temporal field to indicate a time of departure of the market packet from the network component to a next network component in the interconnection network, a field to indicate the source processing node, and a field to indicate the destination processing node.

The node temporal logs created at source processing nodes, the NIC temporal logs created at NICs within source processing nodes, the logs created at destination processing nodes, and the hop temporal logs created at each hop in the interconnection network between the source processing node and the destination processing node are periodically captured and drained to a collection server coupled to the interconnection network. The collection server then reconstructs and analyzes the paths traversed by the marked packets based on the temporal logs stored thereon to determine any potential issues or bottlenecks in the interconnection network.

For example, the field to indicate the destination processing node in the temporal logs in conjunction with the network topology enables the collection server to determine the identity of the next hop for a marked packet when reconstructing the packet's path. If the determined identity of the next hop does not match the next hop identity information in a temporal log, the collection server is able to assess that a routing or other problem occurred in the path traveled by the marked packet. Other insights into the path traveled by marked packets are again made by analyzing the temporal logs in detail, thereby enabling any issues and bottlenecks to be identified.

Figure 4:
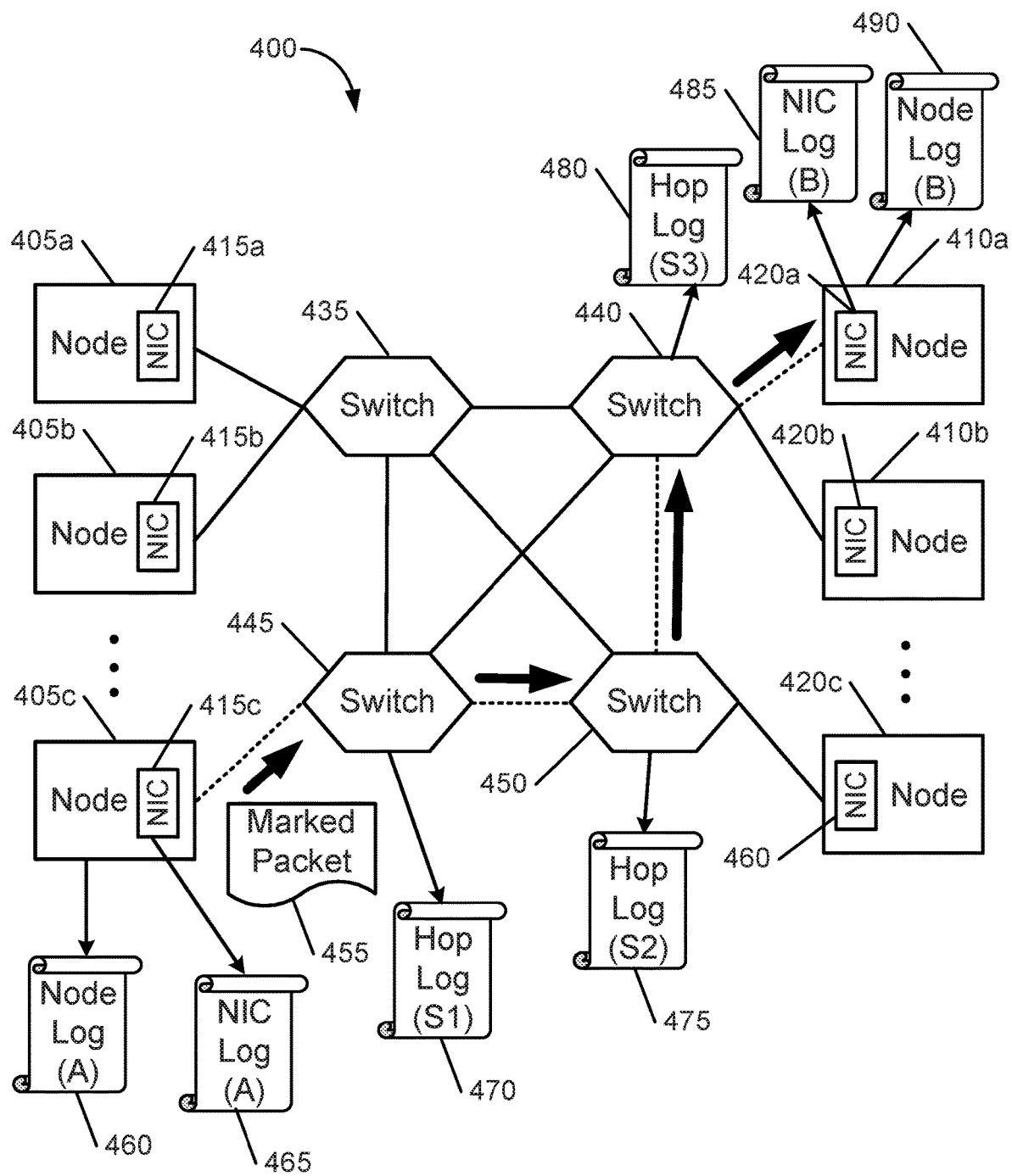
FIG. 4 is a schematic diagram illustrating an interconnection network with a plurality of temporal logs in accordance with various examples.

Attention is now directed to FIG. 4, which illustrates an interconnection network with a plurality of temporal logs in accordance with various examples. Interconnection network 400, similar to interconnection network of FIG. 1, has a number of source and destination processing nodes, e.g., source processing nodes 405a-c and destination processing nodes 410a-c, interconnected by a number of network components, e.g., network switches 435-450. The source processing nodes 405a-c and destination processing nodes 410a-c include network interface controllers ("NICs") for processing packets according to a network protocol implemented in the interconnection network 400, e.g., NICs 415a-c in source processing nodes 405a-c and NICs 420a-c in destination processing nodes 410a-c.

As described herein, path-synchronous performance monitoring of network transactions based on source code attribution in interconnection network 400 enables the periodic tracking of packets originating at a NIC within a source processing node, following their propagation through every component in interconnection network 400 traversed by the packets, and collecting performance metrics in temporal logs in each network component. Such detailed tracking enables a sampled network event to be attributed back to its application source code, thereby allowing application developers to understand, isolate and correct performance bottlenecks, including the ability to distinguish between systematic structural issues and transient network behaviors.

In an illustrated example, marked packet 455 originates at NIC 415c at source processing node 405c and traverses switches 445, 450 and 440 while en route to NIC 420a in destination processing node 410a. The marked packet 455 is selected as a marked packet on a sampling basis by NIC 415c upon receiving a network command from the source processing node 405c with a unique identifier CID and an enabled TM tag indicating that a network transaction is to be monitored. The marked packet 455 contains an enabled PM tag in its header, indicating to each network component in its path, e.g., switches 445, 450 and 440, that the packet is to be monitored.

Path-synchronous performance monitoring of the marked packet 455 is accomplished by collecting performance metrics in a series of temporal logs throughout the path traversed by the marked packet 455, starting at source processing node 405c and ending at destination processing node 410a. Each temporal log is stored in a local buffer in its respective network component and contains a series of data tuples with fields indicating, for example, the source of the marked packet 455 and its destination, the identity of the next hop for the marked packet 455, and temporal information indicating a time of arrival and a time of departure for the marked packet 455. Additional information regarding the marked packet 455 and the network component may also be stored in the corresponding temporal log as desired.

It is appreciated that storing the identity of the next hop in the temporal logs enables a collection server coupled to the interconnection network 400 to reconstruct and analyze the path traversed by the marked packet 455 along its journey through interconnection network 400. It is also appreciated that in an interconnection network adopting a request-response protocol, the PM tag in the marked packet 455 is retained from request to response so that its journey is tracked in both directions. In various examples, doing so may require the NICs at source and destination processing nodes to be modified to propagate PM tags in marked packets from request to response. Every network packet transiting through interconnection network 400 may at least contain a source identifier, a destination identifier, and the PM tag. Furthermore, in settings where the interconnection network employs a higher-level data-transfer protocol, the PM tag may be retained throughout the transaction. Consider, for example, the case where the protocol is to send a "large" message following these steps: 1) a short message is sent from source A to destination B indicating that a message is ready; 2) B at a later point becomes ready and issues a "pull" from A; 3) A sends the full message to B; and 4) B sends an ACK to A. In this setting, if the first message is identified to be tracked, the path-synchronous performance monitoring described herein is able to track all 4 steps in the process.

As shown in FIG. 4, path-synchronous performance monitoring of marked packet 455 is accomplished by storing a node log (A) 460 in source processing node 405c, a NIC log (A) 465 in NIC 415c, a hop log (S1) 470 in switch 445, a hop log (S2) 475 in switch 450, a hop log (S3) 480 in switch 440, a NIC log (B) 485 in NIC 420a and a node log (B) 490 in destination processing node 410a. It is appreciated that additional logs may be created for additional hops in the network 400 traversed by marked packets. It is also appreciated that interconnection network 400 may have additional source and destination processing nodes as well as additional switches that are not shown in FIG. 4. Each source processing node, destination processing node, switch and network component in interconnection network 400 stores temporal logs collecting performance metrics for marked packets.

Figure 5:
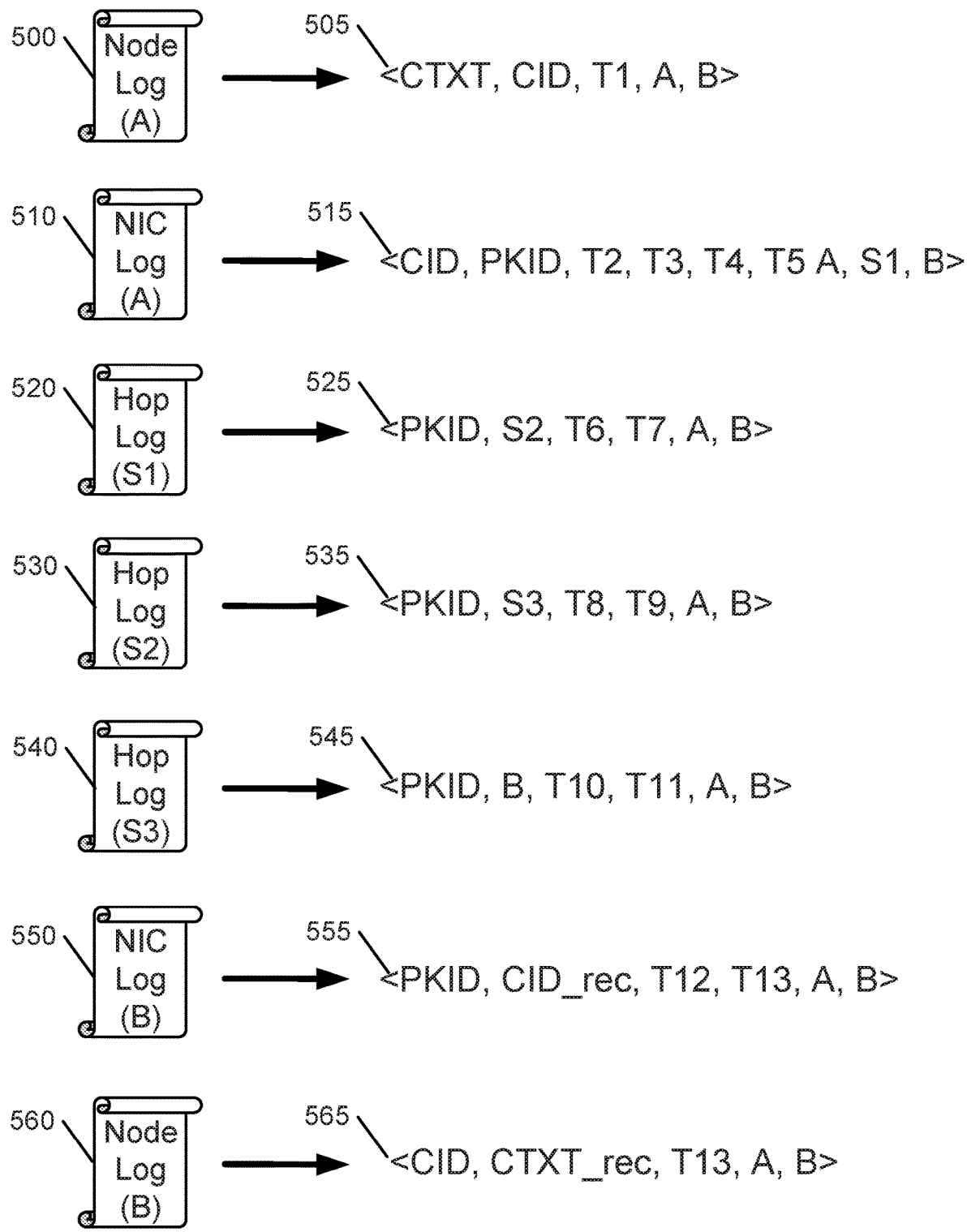
FIG. 5 is a schematic diagram illustrating the plurality of temporal logs of FIG. 4 and their data tuples.

The contents of logs 460-490 are shown in more detail in FIG. 5. Node log (A) 500, similar to Node log (A) 460 of FIG. 4, is a node log created at a source processing node upon selection of a network transaction to be monitored. Node log (A) 500 stores data tuples in a local buffer of its respective source processing node. Each data tuple 505 consists of a field for a source code attribution value (e.g., CTXT), a field for a unique identifier representing a network command (e.g., CID) corresponding to the network transaction, a temporal field to store a time value (e.g., T1) corresponding to a time of issuance of the network command, a field to identify the source processing node (e.g., A), and a field to identify the destination processing node (e.g., B).

NIC log (A) 510, similar to NIC log (A) 465 of FIG. 4, stores data tuples in a local buffer of its respective source processing node. Each data tuple 515 consists of a field for the unique identifier CID representing the network command issued to the NIC by the source processing node (e.g., NIC 415c in source processing node 405c), a packet identifier "PKID" created by the NIC to identify a marked packet (e.g., marked packet 455), a temporal field to indicate a time value (e.g., T2) corresponding to a time when the NIC receives the network command, a temporal field to indicate a time value (e.g., T3) corresponding to a time when the first packet for the network command is sent to its next hop (e.g., switch 445 for marked packet 455 of FIG. 4), a temporal field to indicate a time value (e.g., T4) corresponding to a time when the first marked packet for the network command is sent to its next hop, a temporal field to indicate a time value (e.g., T5) corresponding to a time when the last packet for the network command is sent to its next hop, a field to identify the source processing node (e.g., A), a field to identify the network component in the next hop (e.g., switch 445), and a field to identify the destination processing node (e.g., B).

It is appreciated that the packets generated for a network command may contain non-marked packets, hence the need to store temporal information for the first packet sent, the first marked packet sent, and the last packet sent to the next hop. It is also appreciated that, depending on the selection of packets to be marked on a sampling basis, the first packet generated for the network command may also be the first marked packet. In this case, the T4 temporal value indicating the time when the first marked packet is sent to its next hop is the same as the T3 temporal value. It is also appreciated that if a plurality of packets corresponding to a single NIC command are marked, the NIC log must be either augmented with the necessary variable number of fields or multiple NIC log records may be generated, with one log record generated for each marked packet.

Hop log (S1) 520, similar to Hop log (S1) 470 of FIG. 4, stores data tuples in a local buffer of its respective network component (e.g., switch 445 of FIG. 4). Each data tuple 525 consists of a field for a packet identifier PKID representing a marked packet arriving at the network component (e.g., marked packet 455 arriving at switch 445), a field to identify the network component in the next hop (e.g., switch 440), a temporal field to indicate a time value (e.g., T6) corresponding to a time when the first marked packet arrives at the network component, a temporal field to indicate a time value (e.g., T7) corresponding to a time when the first marked packet is sent to its next hop (e.g., switch 450 for marked packet 455 of FIG. 4), a field to identify the source processing node (e.g., A), and a field to identify the destination processing node (e.g., B). Hop logs 530 and 540, similar to Hop logs 475 and 480 of FIG. 8, store data tuples 525 and 535, respectively. Data tuples 535 and 535 contain similar fields to data tuple 525 for Hop log 520, storing information to identify a marked packet, its time of arrival and departure, its next hop, its source processing node, and its destination processing node.

Lastly, NIC log (B) 550 and Node log (B) 560 store respective data tuples 555 and 565, indicating information corresponding to the arrival of a marked packet in the destination processing node (e.g., destination processing node 410a of FIG. 4). Such information may contain, for example, in data tuple 555, the packet identifier PKID for the marked packet, the time of arrival at the marked packet, the time of release of the marked packet from the NIC, the source identification node, and the destination processing node. Data tuple 565 may store, for example, the packet identifier PKID for the marked packet, the time of arrival of the marked packet, the source identification node, and the destination processing node.

NIC log (B) 550 and Node log (B) 560 also store information specific to their status as receivers for packets arriving at their final destination in the interconnection network. When a processor at a destination processing node, e.g., destination processing node 110a of FIG. 1, receives a marked packet, the processor collects a receive-side source code attribution (e.g., CPU calling context) corresponding to the receipt of the marked packet for the monitored network transaction. The receive-side source code attribution corresponding to a receive-side calling context is stored in Node Log (B) 565 as CTXT_rec. Similarly, a receive-side identification corresponding to a receive-side network command is stored in NIC log (B) 550 as CID_rec. Recording CTXT_rec and CID_rec and correlating them to CTXT and CID recorded at the source processing node enables a collection server to understand the calling context of both the source and destination processing nodes processing a marked packet in the interconnection network.

It is appreciated that recording various temporal information corresponding to transit times for marked packets in the interconnection network, as well as information corresponding to the source, destination and next hops traversed by a marked packet in the interconnection network enables path-synchronous performance monitoring of network transactions. For example, recording the PKID in hop temporal logs throughout the packet's path in the interconnection network enables the packet's path to be reconstructed and attributed back to the network command that originated the packet (i.e., with the CID recorded at the NIC temporal logs) and ultimately to the source code location corresponding to the network transaction executed by the command (i.e., with the CTXT recorded at the node temporal logs). This allows application developers to understand the behavior of the network and identify any potential issues and bottlenecks that a packet may encounter when traversing the network.

It is also appreciated that the temporal logs recorded across network components in the interconnection network may include additional fields and information, such as, for example, component-specific fields that may include an indication of an anomalous condition at the time of routing the designated marked packet (e.g., a switch running out of credits when transmitting this packet). Further, it is appreciated that in unreliable networks when a marked packet is dropped, no further logs are recorded, providing a clear indication of a dropped packet. It is also appreciated that a log may capture the entire packet header.

Figure 6:
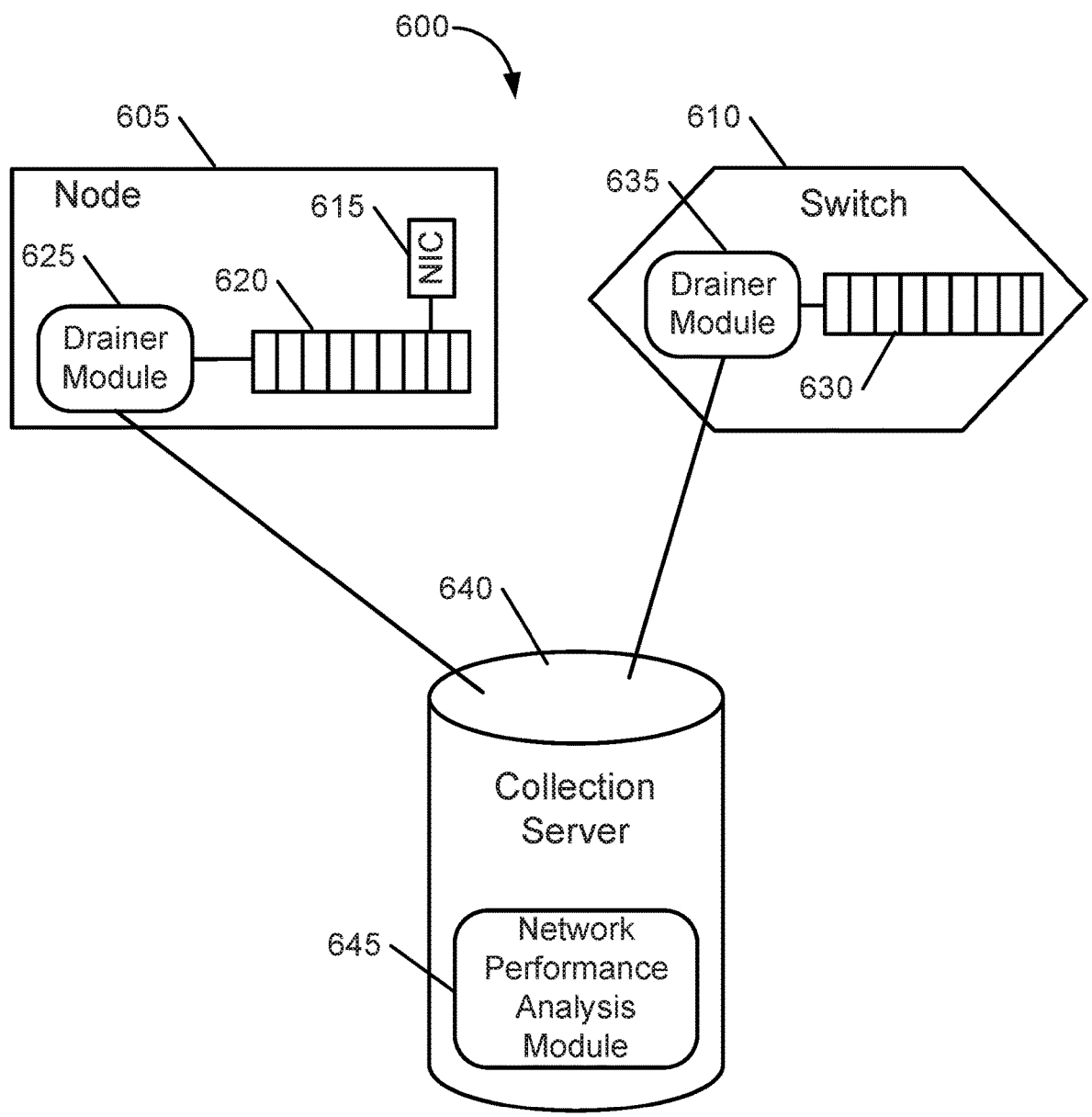
FIG. 6 is a schematic diagram of a processing node and a switch coupled to a collection server in accordance with various examples.

Attention is now directed to FIG. 6, which shows a schematic diagram of a processing node and a switch coupled to a collection server in accordance with various examples. Source processing node 605 and switch 610 are two network components illustrated for an interconnection network 600. Source processing node 605 has a NIC 615, a local buffer 620 for storing node temporal logs for the source processing node 605 and NIC temporal logs for NIC 615, and a Drainer Module 625, similar to Drainer Module 225 of FIG. 2. Likewise, switch 610 has a local buffer 630 for storing hop temporal logs for the switch 610 and a Drainer Module 635. Local buffers 620 and 630 may be, for example, Static Random-Access Memory ("SRAM") buffers that act as circular buffers.

Drainer Modules 625 and 635 drain all the temporal logs stored in local buffers 620 and 630 to Collection Server 640 coupled to the interconnection network 600. The collection server 640 maintains the origin of each temporal log and also appends logs coming from the same network component to the same file. In various examples, data from each Drainer module may be logged to a separate network mounted file hosted on the Collection server 640.

Collection Server 640 also has a Network Performance Analysis Module 645 to reconstruct and analyze the path traversed by all marked packets in interconnection network 600. It is appreciated that the Network Performance Analysis Module 645 is shown within the Collection Server 640 for illustration purposes only. In various examples, the Network Performance Analysis Module 645 may be a separate module connected to the Collection Server 640. In various other examples, multiple Network Performance Analysis Modules may be implemented throughout the interconnection network.

For example, consider the marked packet 455 in interconnection network 400 traveling from source processing node 405c to destination processing node 410a through switches 445, 450 and 440 as shown in FIG. 4. Starting at source processing node 405c, Node log (A) 460 storing data tuple <CTXT, CID, T1, A, B> indicates that at source code context CTXT, a command CID was issued to destination node B (e.g., destination processing node 410a). Sifting through NIC 415's logs for CID shows the following entry for NIC log 465: <CID, A, B, PKID, S1, T2, T3, T4, T5>, where T2-T1 indicates a delay in processing the packet in the node, T4-T2 indicates the time that it took for the NIC to generate and process a marked packet, and the marked packet identified by PKID was injected in the interconnection network 400 at time T4 and sent to switch 445.

Sifting through switch 445's hop log (S1) 470 shows a record of <A, B, PKID, S2, T6, T7>, indicating that the marked packet's delay at switch 445 is T7-T6 and the marked packet was forwarded to switch S2 450. Sifting through switch 450's hop log (S2) 475 shows a record of <A, B, PKID, S3, T8, T9>, indicating that the marked packet's delay at switch 450 is T9-T8, and the marked packet was forwarded to switch S3 440. Sifting through switch 440's hop log (S3) 480 shows a record of <A, B, PKID, B, T10, T11>, indicating that the marked packet's delay at switch 440 is T11-T10, and the marked packet was forwarded to destination B corresponding to the destination processing node 410a.

The path A->S1->S2->S3->B (i.e. source processing node 405c->switch 445->switch 450->switch 440->destination processing node 410a for marked packet 455) with per hop delay and also in-NIC delay can therefore be reconstructed and analyzed in Network Performance Analysis Module 645. Since each network component logs data into its local buffer, there is no need for concurrency control. There is also no need for perfectly synchronized clocks across the system.

Figure 7:
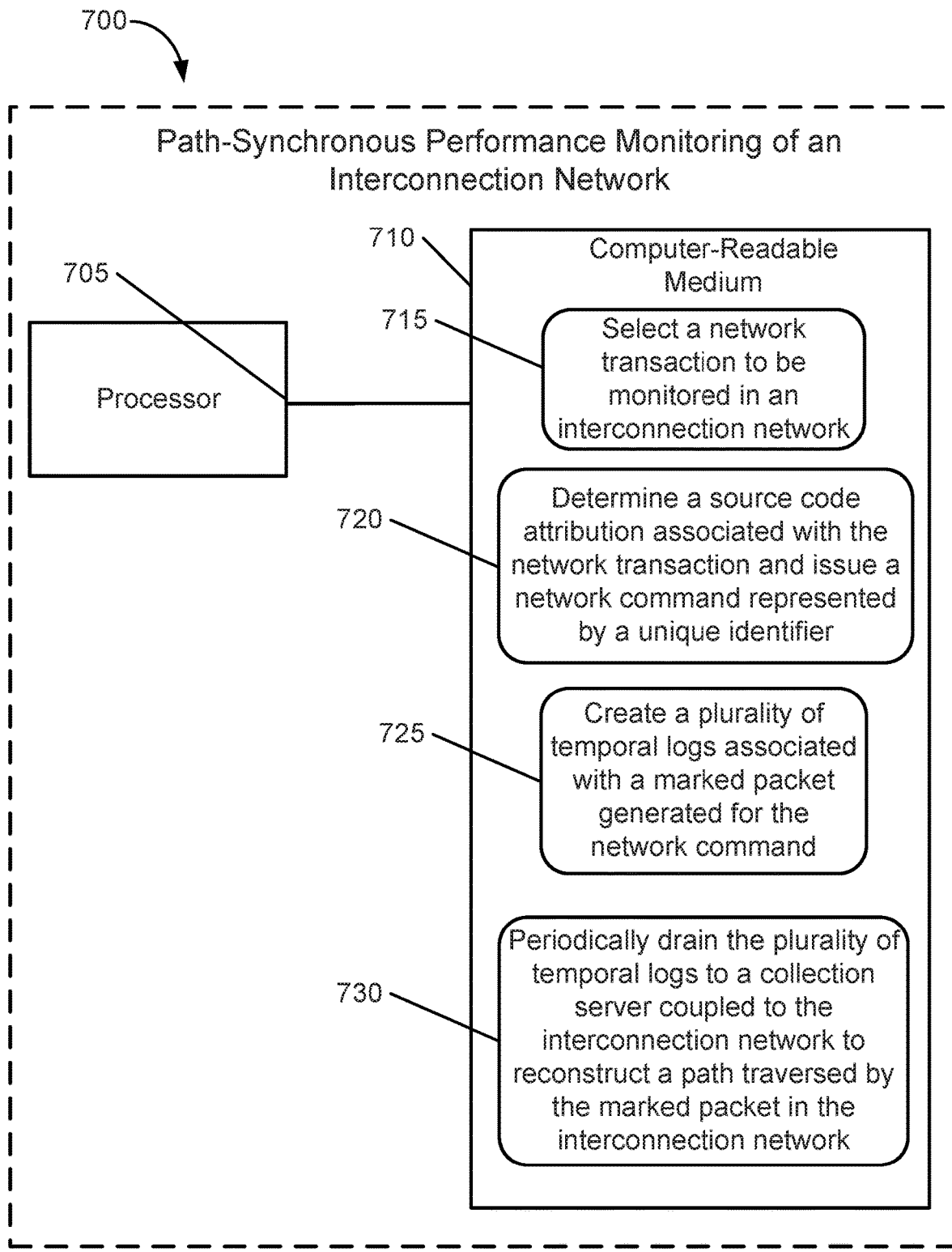
FIG. 7 is a schematic diagram of a system for path-synchronous performance monitoring of an interconnection network based on source code attribution and in accordance with various examples.

Referring now to FIG. 7, a schematic diagram of a system for path-synchronous performance monitoring of an interconnection network based on source code attribution and in accordance with various examples is described. Path-Synchronous Performance Monitoring system 700 includes a processor 705 and a tangible, non-transitory computer-readable medium 710 storing instructions 715-730 that are executed by the processor 705. Computer-readable medium 710 can include volatile and/or non-volatile memory such as Random Access Memory ("RAM"), magnetic memory such as a hard disk and/or tape memory, a Solid State Drive ("SSD"), flash memory, phase change memory, memristive memory, and so on.

Instructions 715 include instructions to select a network transaction to be monitored in an interconnection network. The network transaction is selected by a Profiler Module residing at a source processing node in the interconnection network, such as, for example, Profiler Module 215 in node 200 of FIG. 2. The network transaction is selected on a sampling basis, either arbitrarily or based on pre-determined criteria.

Instructions 720 include instructions to determine a source code attribution associated with the network transaction to be monitored and issue a network command represented by a unique identifier. The network command is issued by the source processing node to a NIC in the source processing node, such as, for example, NIC 230 in node 200. The unique identifier, e.g., CID, is passed to the NIC by the source processing node together with an enabled TM tag when the network command is issued. A source code attribution may include, for example, a CPU calling context CTXT or any other indication that associates a source code location to the network transaction to be monitored.

Instructions 725 include instructions to create a plurality of temporal logs associated with a marked packet generated for the network command. Packets are marked with a PM tag in their header by the NIC at the source processing node. Temporal logs, as described above, are created at each network component traversed by a marked packet in the interconnection network, such as, for example, the various temporal logs 460-490 shown in FIG. 4 for marked packet 455 in interconnection network 400.

Lastly, instructions 730 periodically drain the plurality of temporal logs (in an unsynchronized fashion) to a collection server coupled to the interconnection network to reconstruct a path traversed by the marked packet in the interconnection network and attribute the marked packet back to the source code attribution. The plurality of temporal logs enables the collection server to reconstruct and analyze the path traveled by the marked packet to identify any issues and potential bottlenecks in the interconnection network, thereby allowing application developers to isolate and fix problems and correlate them to application source code as desired.

It is appreciated that the previous description of the disclosed examples is provided to enable any person skilled in the art to make or use the present disclosure. Various modifications to these examples will be readily apparent to those skilled in the art, and the generic principles defined herein may be applied to other examples without departing from the spirit or scope of the disclosure. Thus, the present disclosure is not intended to be limited to the examples shown herein but is to be accorded the widest scope consistent with the principles and novel features disclosed herein.

What is claimed is:

1. A system for path-synchronous performance monitoring of an interconnection network based on source code attribution, comprising a processing node and a collection server, wherein the processing node comprises:
   a processor;
   a non-transitory machine-readable storage medium encoded with instructions executable by the processor to perform a method comprising:
      selecting a network transaction to be monitored, determine a source code attribution associated with the network transaction to be monitored, wherein the network transaction originates with a source processing node, propagates through an intermediate component, and ends at a destination processing node;
      generating a unique identifier (CID) for a network command to execute the network transaction, wherein the source processing node captures the source code attribution associated with the network transaction to be monitored and uses the source code attribution to generate the unique identifier (CID);
      generating the network command, wherein the network command comprises the unique identifier (CID) and a transaction monitoring tag;
      transmitting the network command to a network interface controller (NIC); and
      generating a first temporal performance log that comprises the unique identifier (CID), the source code attribution, time of issuance of the network command, and an indication of the destination processing node; and
   the network interface controller is configured to:
      determine that a particular data packet includes the transaction monitoring tag associated with the network command of the network transaction to be monitored; and
      based on the transaction monitoring tag included with the particular data packet, update a second temporal performance log to include a second time associated with the particular data packet at the network interface controller;
   wherein, at the collection server, a path traversed by the particular data packet is reconstructed to identify a network issue based on the first temporal performance log associated with the source processing node and the second temporal performance log associated with the network interface controller.

2. The system of claim 1, wherein the method further comprises selecting the network transaction to be monitored on a sampling basis.

3. The system of claim 1, wherein the source code attribution associated with the network transaction is selected from the group consisting of a source code calling context indicating a source code location initiating the network transaction and a source code location associated with a network event related to the network transaction.

4. The system of claim 1, wherein the node temporal log comprises a plurality of data tuples, each data tuple consisting of a field for a source code attribution value, a field for a unique identification representing the network command, a temporal field for the time of issuance of the network command, a field to indicate the processing node as a source processing node, and a field to indicate a destination processing node for the particular data packet.

5. The system of claim 1, wherein periodically capturing the node temporal log comprises periodically draining the captured node temporal log to the collection server coupled to the interconnection network.

6. The system of claim 5, wherein the collection server stores a plurality of hop temporal logs, each hop temporal log drained from a network component at each hop of the interconnection network traversed by the particular data packet.

7. The system of claim 6, wherein the network interface controller marks one or more packets on a sampling basis and updates one or more temporal logs that is periodically drained to the collection server.

8. The system of claim 7, wherein the collection server reconstructs a second path traversed by the one or more marked packets based on the one or more temporal logs and the plurality of hop temporal logs.

9. The system of claim 1, wherein the source code attribution initiates an identification of a source code location of a computer software instruction for initiating the network transaction.

10. A method for path-synchronous performance monitoring of an interconnection network based on source code attribution, comprising:
   selecting a network transaction to be monitored, wherein the network transaction originates with a source processing node, propagates through an intermediate component, and ends at a destination processing node;
   generating, by the source processing node, a unique identifier (CID) for a network command to execute the network transaction, wherein the source processing node captures the source code attribution associated with the network transaction to be monitored and uses the source code attribution to generate the unique identifier (CID);
   generating, at the source processing node in the interconnection network, the network command, wherein the network command comprises the unique identifier (CID) and a transaction monitoring (TM) tag;
   transmitting, by the source processing node, the network command to a network interface controller (NIC);
   generating, by the source processing node, a first temporal performance log that comprises the unique identifier (CID), the source code attribution, time of issuance of the network command, and an indication of the destination processing node;
   determining, by the network interface controller, that a particular data packet includes the transaction monitoring tag associated with the network command of the network transaction to be monitored;
   based on the transaction monitoring tag included with the particular data packet, updating, by the network interface controller, a second temporal performance log to include a second time associated with the particular data packet at the network interface controller; and
   at a collection server, reconstructing a path traversed by each marked packet to identify a network issue based on the first temporal performance log associated with the source processing node and the second temporal performance log associated with the network interface controller.

11. The method of claim 10, wherein the selecting of the network transaction is based on sampling.

12. The method of claim 10, further comprising marking one or more packets generated for the network command on a sampling basis.

13. The method of claim 10, further comprising marking, at the network interface controller in the source processing node, one or more packets generated for the network command by setting a performance monitoring tag in a header of the one or more packets.

14. The method of claim 10, wherein generating the network command further comprises passing the enabled TM tag to the network interface controller together with the unique identifier (CID) when issuing the network command to the network interface controller.

15. The method of claim 10, further comprising periodically capturing the plurality of temporal logs at the source processing node, the destination processing node, and the intermediate component and draining the captured plurality of temporal logs to the collection server.

16. The method of claim 15, further comprising, at the collection server, collecting a receive-side source code attribution from the first temporal log or the second temporal performance log and correlating the receiver-side source code attribution to the source code attribution corresponding to the network transaction.

17. A non-transitory computer readable medium comprising instructions executable by a processor to:
   select a network transaction to be monitored in an interconnection network, wherein the network transaction originates with a source processing node, propagates through an intermediate component, and ends at a destination processing node;
   generate a unique identifier (CID) for a network command to execute the network transaction, wherein the source processing node captures the source code attribution associated with the network transaction to be monitored and uses the source code attribution to generate the unique identifier (CID);
   generate the network command, wherein the network command comprises the unique identifier (CID) and a transaction monitoring (TM) tag;
   transmit the network command to a network interface controller (NIC);
   generate a first temporal performance log that comprises the unique identifier (CID), the source code attribution, time of issuance of the network command, and an indication of the destination processing node;
   determine that a particular data packet includes the transaction monitoring tag associated with the network command of the network transaction to be monitored; and
   based on the transaction monitoring tag included with the particular data packet, update a second temporal performance log to include a second time associated with the particular data packet at the network interface controller,
   wherein, at a collection server, a path traversed by the particular data packet is reconstructed to identify a network issue based on the first temporal performance log associated with the source processing node and the second temporal performance log associated with the network interface controller.

18. The non-transitory computer readable medium of claim 17, further comprising instructions to send the particular data packet to the destination processing node in the interconnection network, the particular data packet comprising a performance monitoring tag in a header of the particular data packet.

19. The non-transitory computer readable medium of claim 17, further comprising instructions to issue the network command to the network interface controller, the network interface controller generating the particular data packet for the network command on a sampling basis.

20. The non-transitory computer readable medium of claim 17, wherein a plurality of hop temporal logs are created at each one of a plurality of hops in the interconnection network.

* * * * *